United States Patent
Kageyama

(10) Patent No.: US 8,789,875 B2
(45) Date of Patent: Jul. 29, 2014

(54) VEHICLE BODY STRUCTURE AND METHOD OF MANUFACTURING VEHICLE BODY

(75) Inventor: Yusuke Kageyama, Isehara (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 6 days.

(21) Appl. No.: 13/589,379

(22) Filed: Aug. 20, 2012

(65) Prior Publication Data

US 2013/0049407 A1 Feb. 28, 2013

(30) Foreign Application Priority Data

Aug. 29, 2011 (JP) ................................. 2011-185772
May 15, 2012 (JP) ................................. 2012-111273

(51) Int. Cl.
*B62D 21/10* (2006.01)

(52) U.S. Cl.
USPC ................. 296/193.07; 296/203.02; 296/204; 296/203.01; 29/897.2

(58) Field of Classification Search
USPC ............. 296/193.06, 193.07, 193.08, 193.09, 296/203.02, 203.03, 203.04, 204, 209, 296/187.08; 29/897.2
IPC ....................................................... B62D 21/00
See application file for complete search history.

(56) References Cited

U.S. PATENT DOCUMENTS

| | | | | |
|---|---|---|---|---|
| 2,190,224 A * | 2/1940 | Vincent | ........................ | 280/783 |
| 2,212,636 A * | 8/1940 | Dorris | ............................... | 280/2 |
| 4,557,519 A * | 12/1985 | Matsuura | ...................... | 296/204 |
| 5,806,918 A * | 9/1998 | Kanazawa | ..................... | 296/204 |
| 6,203,099 B1 * | 3/2001 | Iwatsuki | ........................ | 296/204 |
| 7,188,893 B2 * | 3/2007 | Akasaka | ........................ | 296/204 |
| 7,306,281 B2 * | 12/2007 | Kobayashi et al. | ........... | 296/204 |
| 7,500,714 B2 * | 3/2009 | Abe et al. | ................. | 296/193.07 |
| 7,748,774 B2 * | 7/2010 | Kurata | ...................... | 296/187.08 |
| 7,823,964 B2 * | 11/2010 | Tasumi et al. | ................. | 296/204 |
| 7,900,995 B2 * | 3/2011 | Sato et al. | ................... | 296/187.1 |
| 8,052,204 B2 * | 11/2011 | Boettcher et al. | ........ | 296/193.07 |
| 8,070,215 B2 * | 12/2011 | Yoshioka et al. | ........ | 296/187.12 |
| 2004/0104602 A1 * | 6/2004 | Cardimen et al. | ............ | 296/204 |
| 2004/0155488 A1 * | 8/2004 | Saito | .............................. | 296/204 |
| 2005/0082877 A1 * | 4/2005 | Gotou et al. | ................... | 296/204 |

(Continued)

FOREIGN PATENT DOCUMENTS

| | | |
|---|---|---|
| DE | 10 2006 009 100 A1 | 8/2007 |
| JP | 11-348815 A | 12/1999 |
| JP | 2005-306299 A | 11/2005 |
| JP | 2008-018894 A | 1/2008 |

*Primary Examiner* — Glenn Dayoan
*Assistant Examiner* — Pinel Roman
(74) *Attorney, Agent, or Firm* — Foley & Lardner LLP

(57) ABSTRACT

Provided is a vehicle body structure including: a front frame member disposed in a front part of a vehicle body; a rear frame member disposed in a rear part of the vehicle body; and paired left and right middle frame members disposed on outer sides, in a vehicle width direction, of the vehicle body, respectively, and extending in a vehicle front-rear direction between the front and rear frame members. Each middle frame member includes: a side sill disposed on an outer side in the vehicle width direction; and a center side member disposed inward, in the vehicle width direction, of the side sill and coupling the front and rear frame members. The center side member extends to shift farther outward in the vehicle width direction as it gets closer to rear of the vehicle. The center side member is set larger in strength than the side sill.

18 Claims, 14 Drawing Sheets

(56) References Cited

U.S. PATENT DOCUMENTS

| | | | |
|---|---|---|---|
| 2007/0126264 A1* | 6/2007 | Mizuma et al. | 296/204 |
| 2008/0252104 A1* | 10/2008 | Yamaguchi et al. | 296/203.04 |
| 2010/0231002 A1* | 9/2010 | Yoshioka et al. | 296/187.12 |
| 2012/0256446 A1* | 10/2012 | Yasuhara et al. | 296/193.07 |
| 2012/0256448 A1* | 10/2012 | Yasui et al. | 296/209 |

* cited by examiner

VEHICLE BODY STRUCTURE AND METHOD OF MANUFACTURING VEHICLE BODY

BACKGROUND OF THE INVENTION

1. Field of Invention

The present invention relates to a vehicle body structure and a method of manufacturing a vehicle body.

2. Description of Related Art

Japanese Patent Application Publication No. H11-348815 discloses a frame structure in which a lower frame member is provided on a lower side, an upper frame member is provided on an upper side, and the lower frame member and the upper frame member are coupled to each other in the top-bottom direction. The lower frame member and the upper frame member are each disposed in a pair on left and right sides and extend in the front-rear direction from the front end to the rear end of the vehicle body.

Japanese Patent Application Publication No. 2005-306299 discloses a vehicle body structure including paired left and right sill members extending in the front-rear direction in lower lateral parts of the vehicle body, respectively, paired left and right roof side rails extending in the front-rear direction in upper lateral parts of the vehicle body, respectively, a roof cross member coupling the paired left and right roof side rails to each other in the vehicle width direction, and pillar members coupling the sill members and their respective roof side rails to each other in the top-bottom direction, all of which are curved in the entire lengths thereof, so that the whole vehicle body has what is called a shell structure.

SUMMARY OF THE INVENTION

Of the vehicle body structures described above, the former increases the rigidity of the vehicle body by disposing the upper frame members in addition to the lower frame members, while the latter increases the rigidity of the vehicle body by increasing the whole thickness of each member forming the vehicle body such as the sill members. For these reasons, the vehicle body structures described above have a problem of a heavy vehicle body as a whole.

The present invention has been made in view of the above problem. An object of the present invention is to provide a vehicle body structure and a method of manufacturing a vehicle body with which a vehicle body can be made lighter as a whole while maintaining its rigidity at a high level.

One aspect of the present invention provides a vehicle body structure including: a front frame member disposed in a front part of a vehicle body; a rear frame member disposed in a rear part of the vehicle body; and paired left and right middle frame members disposed on outer sides, in a vehicle width direction, of the vehicle body, respectively, and extending in a vehicle front-rear direction between the front frame member and the rear frame member. Each of the paired left and right middle frame members includes: a first middle frame member disposed on an outer side in the vehicle width direction; and a second middle frame member disposed inward, in the vehicle width direction, of the first middle frame member and coupling the front frame member and the rear frame member to each other. The second middle frame member extends in such a way as to shift farther outward in the vehicle width direction as it gets closer to rear of the vehicle. Strength of the second middle frame member is set larger than strength of the first middle frame member.

BRIEF DESCRIPTION OF DRAWINGS

The invention will now be described with reference to the accompanying drawings wherein.

DETAILED DESCRIPTION OF THE PREFERRED EMBODIMENT

Hereinbelow, embodiments of the present invention will be described in detail with reference to the drawings.

First Embodiment

Figure 1:
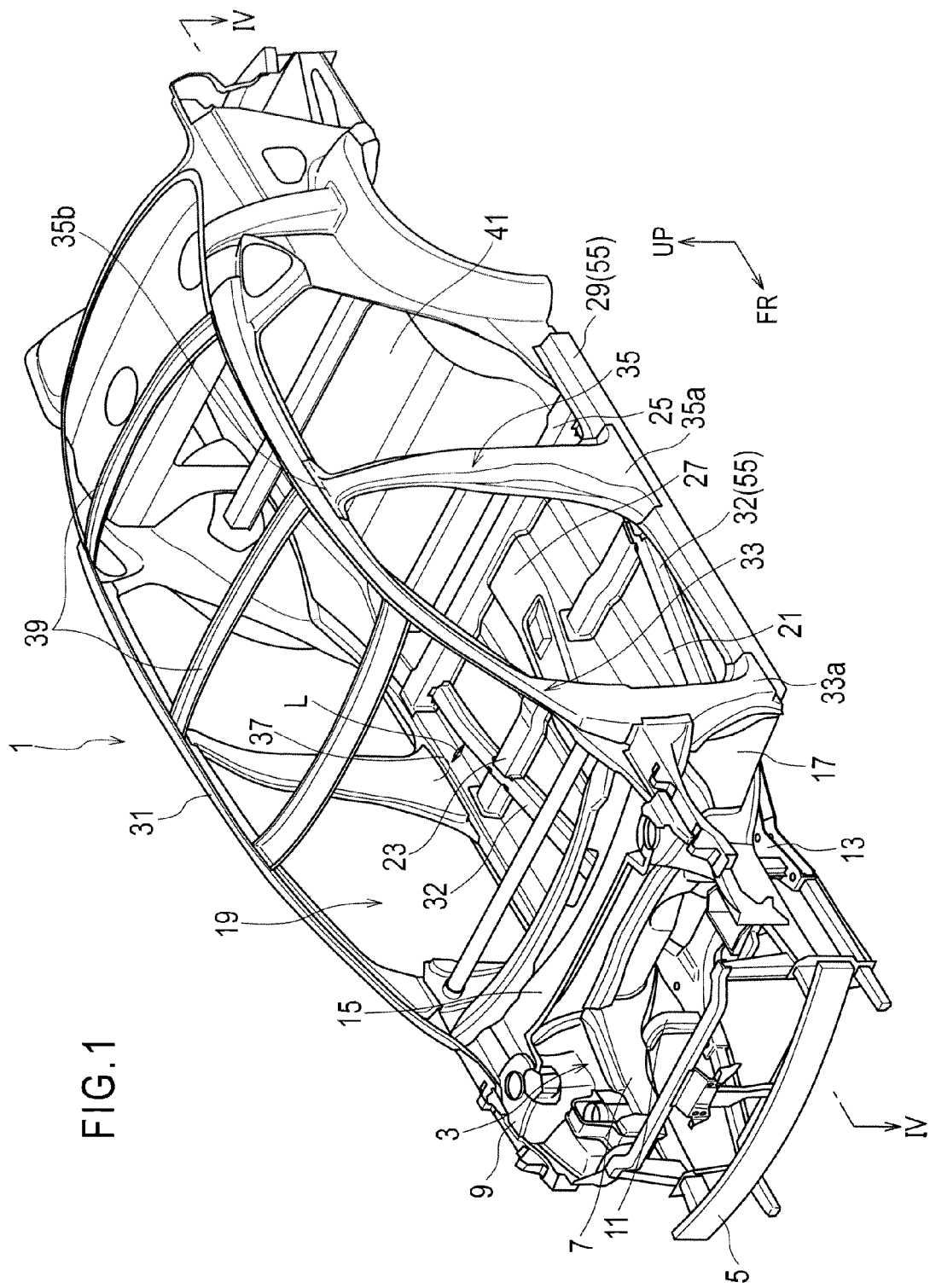
FIG. 1 is a perspective view of an entire vehicle body of a first embodiment of the present invention seen obliquely from the front.

As shown in FIG. 1, in a front part of a vehicle body 1 of a first embodiment, an engine room 3 is arranged. Specifically, a bumper reinforcement 5 extending in the vehicle width direction is arranged at the front end of the vehicle body, and paired left and right side members 7 are provided extending from the bumper reinforcement 5 toward the rear of the vehicle. Moreover, paired left and right strut towers 9 are arranged on both sides, in the vehicle width direction, of the side members 7, respectively. A suspension member 13 is supported on and below the side members 7 with coupling brackets 11 disposed therebetween. Furthermore, the left and right strut towers 9 are bridged by a cowl top 15 extending in the vehicle width direction. Note that a cabin 19 is provided behind the engine room 3 with a dash lower panel 17 disposed therebetween.

A front floor panel 21 extending in the front-rear direction and the vehicle width direction is arranged in a lower area of the cabin 19, and the dash lower panel 17 bending to extend upward is arranged on a front side of the front floor panel 21. As described later, center side members 32, a center cross member 23, and a seat cross member 25 are joined to the cabin side of the front floor panel 21. A floor tunnel 27 extending in the front-rear direction and protruding to the cabin side, which is upward, is provided in a center portion, in the vehicle width direction, of the front floor panel 21. Side portions of side sills 29 are joined to both ends, in the vehicle width direction, of the seat cross member 25, respectively. Moreover, the paired left and right side sills 29 are provided respectively in lower areas of the lateral sides of the vehicle body, joined respectively to the lateral ends of the front floor panel 21, and extend in the vehicle front-rear direction. On the other hand, in upper areas of the lateral sides of the vehicle body, roof side rails 31 extend in the vehicle front-rear direction, respectively. Each side sill 29 and its corresponding roof side rail 31 are coupled to each other in the top-bottom direction by a front pillar 33 and a center pillar 35. Specifically, a lower end portion 33a of the front pillar 33 and a lower end portion 35a of the center pillar 35 are joined to the side sill 29. Here, a connecting portion 37 at which the lower end portion 35a of the center pillar 35 and the side sill 29 are connected, and the center side member 32 are disposed away from each other with a predetermined clearance L therebetween in the vehicle width direction. Moreover, while the side sill 29 is joined to the lateral end of the front floor panel 21, the side sill 29 also couples the lower end portions 33a and 35a of the front pillar 33 and center pillar 35 to each other. Note that the left and right roof side rails 31 and 31 are bridged by a roof cross member 39 extending in the vehicle width direction. In addition, the strength of the center side member 32 is set larger than the strength of the side sill 29.

Further, a rear floor panel 41 is arranged behind the seat cross member 25 continuously from the front floor panel 21.

Figure 2:
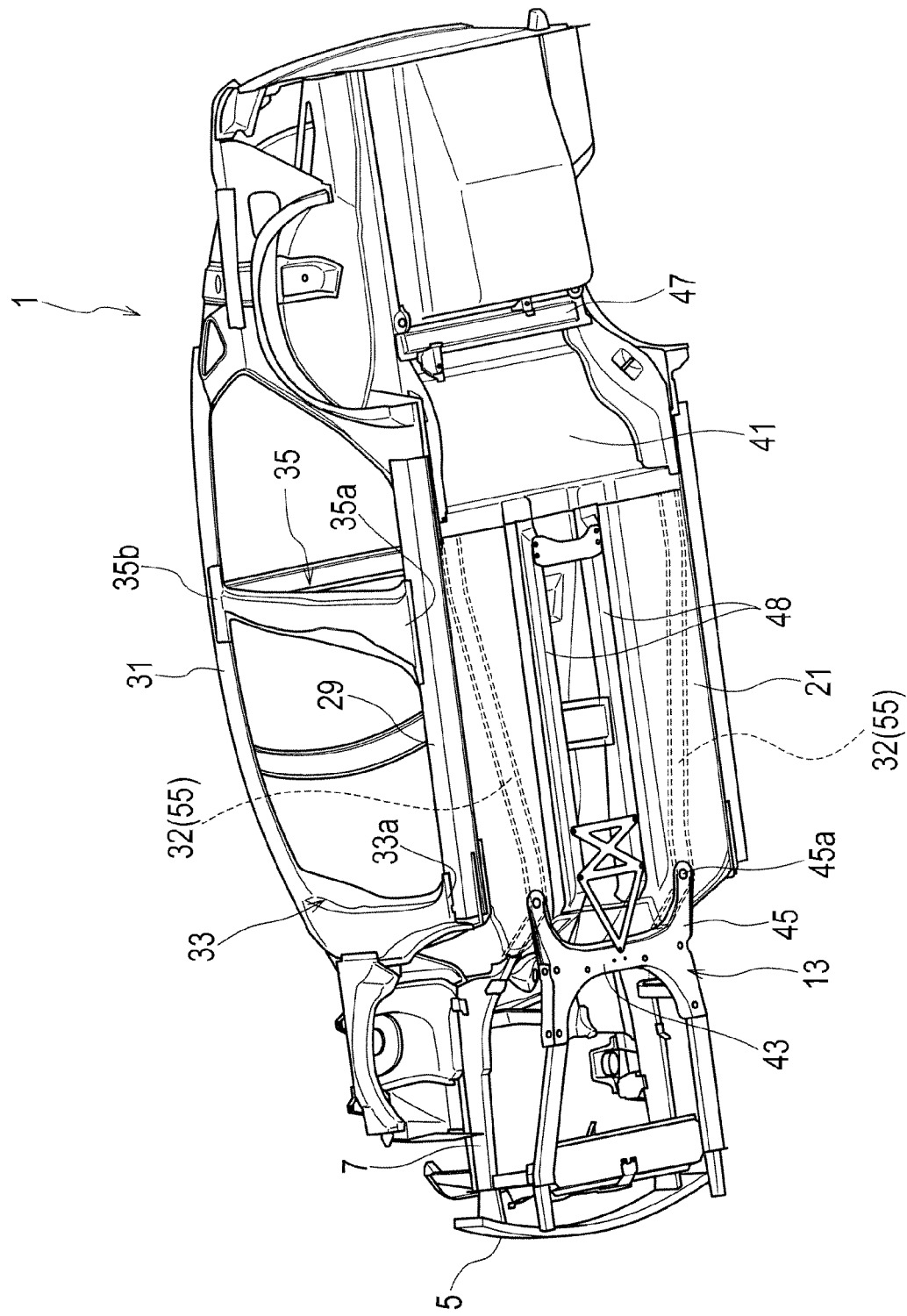
FIG. 2 is a perspective view of the vehicle body in FIG. 1 looked up obliquely from below.

As shown in FIG. 2, the suspension member 13 is formed in an H shape in a plan view and is formed of a body portion 43 and front-rear extending portions 45 as an integral part. The body portion 43 extends in the vehicle width direction while the front-rear extending portions 45 are provided at both ends, in the vehicle width direction, of the body portion 43 and extend in the front-rear direction. Moreover, rear ends 45a of the front-rear extending portions 45 are fastened respectively to the center side members 32 with the front floor panel 21 disposed therebetween. Specifically, the rear end 45a of each front-rear extending portion 45 is disposed on the lower side (non-cabin side) of the front floor panel 21 while each center side member 32 is disposed on the upper side (cabin side) of the front floor panel 21. Thus, the rear end 45a is fastened to a front portion of the center side member 32 disposed on the upper side of the front floor panel 21 from the lower side of the front floor panel 21 with the front floor panel 21 sandwiched therebetween. Moreover, a rear cross member 47 extending in the vehicle width direction and support members 48 extending in the vehicle front-rear direction are arranged on the lower surface of the rear floor panel 41.

Figure 3:
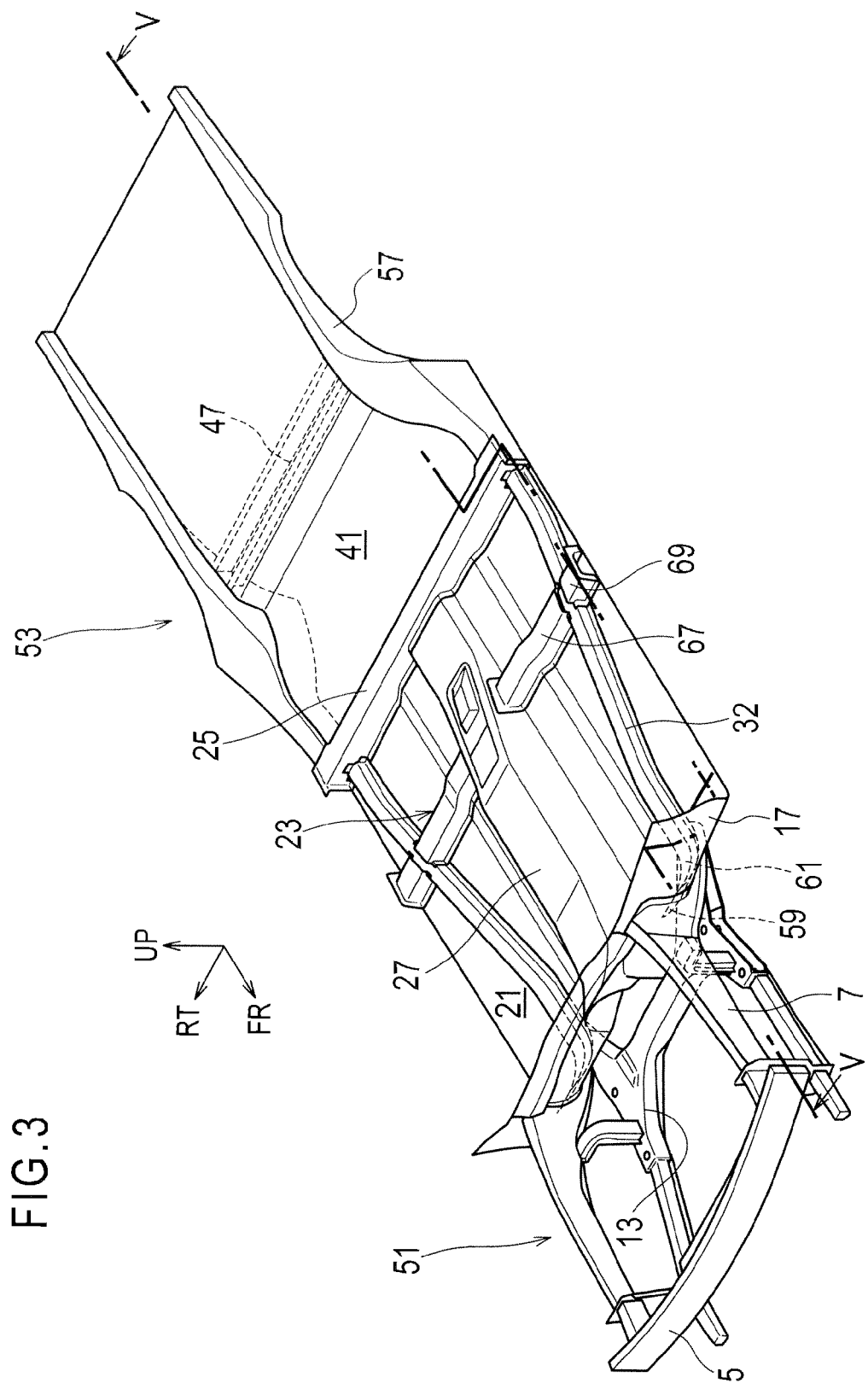
FIG. 3 is a perspective view showing a main part of the vehicle body of the first embodiment.
Figure 4:
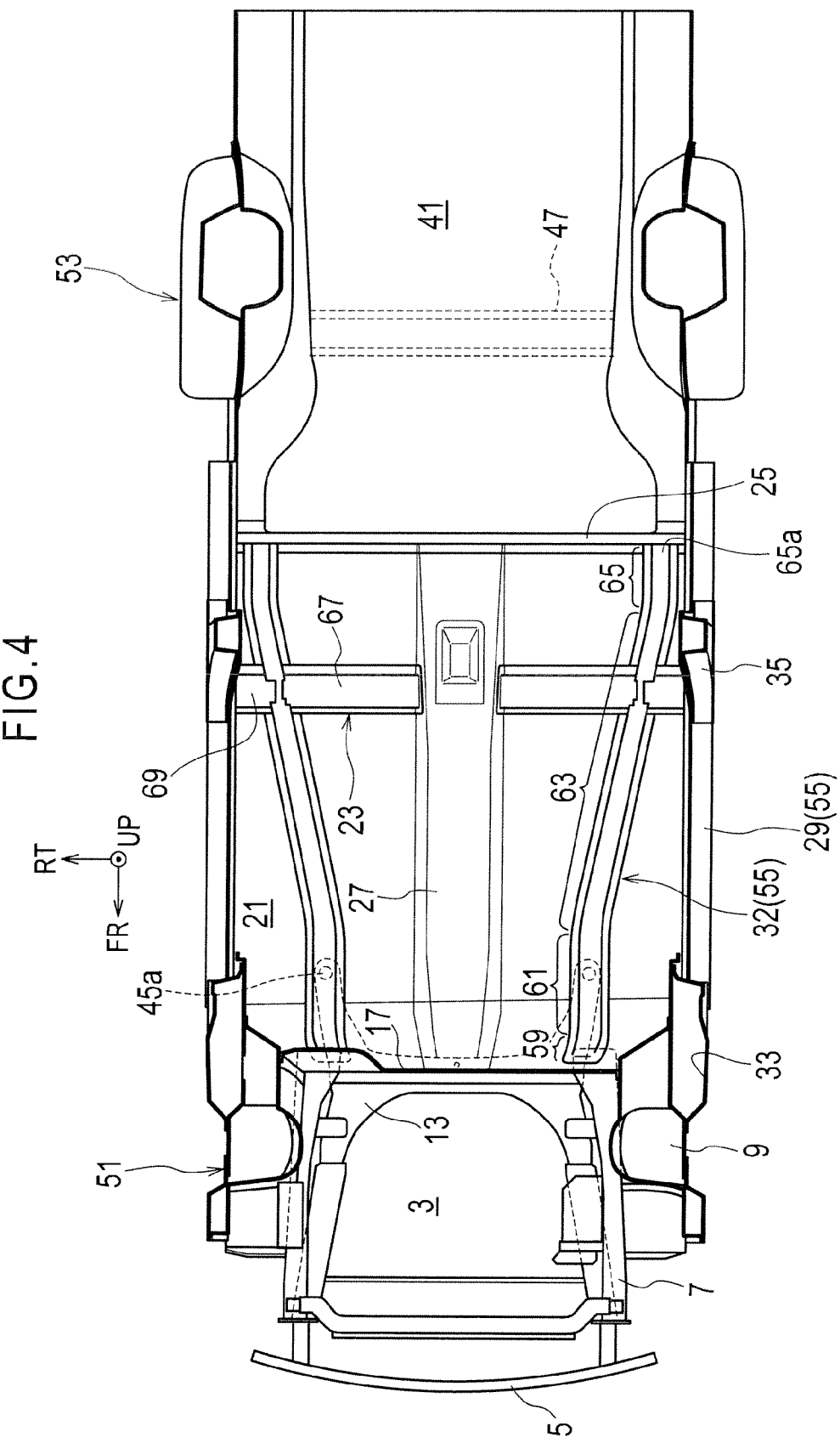
FIG. 4 is a cross-sectional view taken along the IV-IV line in FIG. 1.

As shown in FIGS. 3 and 4, the vehicle body structure of this embodiment includes: a front frame member 51 disposed in the front part of the vehicle body; a rear frame member 53 disposed in a rear part of the vehicle body; and paired left and right middle frame members 55 disposed respectively on outer sides, in the vehicle width direction, of the vehicle body (on outer sides of the cabin) and extending in the vehicle front-rear direction between the front frame member 51 and the rear frame member 53.

The front frame member 51 is a frame member arranged around the engine room 3. Specifically, the front frame member 51 includes: the bumper reinforcement 5 at the front end of the vehicle body; the side members 7 extending rearward from the bumper reinforcement 5; and the suspension member 13 arranged below the side members 7.

The rear frame member 53 includes: the seat cross member 25 extending in the vehicle width direction; the rear floor panel 41 extending rearward from the seat cross member 25; paired left and right rear side members 57 joined respectively to both ends, in the vehicle width direction, of the rear floor panel 41 and extending in the front-rear direction; and the rear cross member 47 joined to the lower surface of the rear floor panel 41. The seat cross member 25 is disposed at the front end of the rear frame member 53.

Each of the paired left and right middle frame members 55, to be specific, includes: the side sill 29 (first middle frame member) disposed on an outer side in the vehicle width direction; and the center side member 32 (second middle frame member) disposed inward, in the vehicle width direction, of the side sill 29 and coupling the front frame member 51 and the rear frame member 53 to each other. Moreover, the floor tunnel 27 extending in the front-rear direction and protruding upward (to the cabin side) is provided in the center portion, in the vehicle width direction, of the front floor panel 21.

Figure 5:
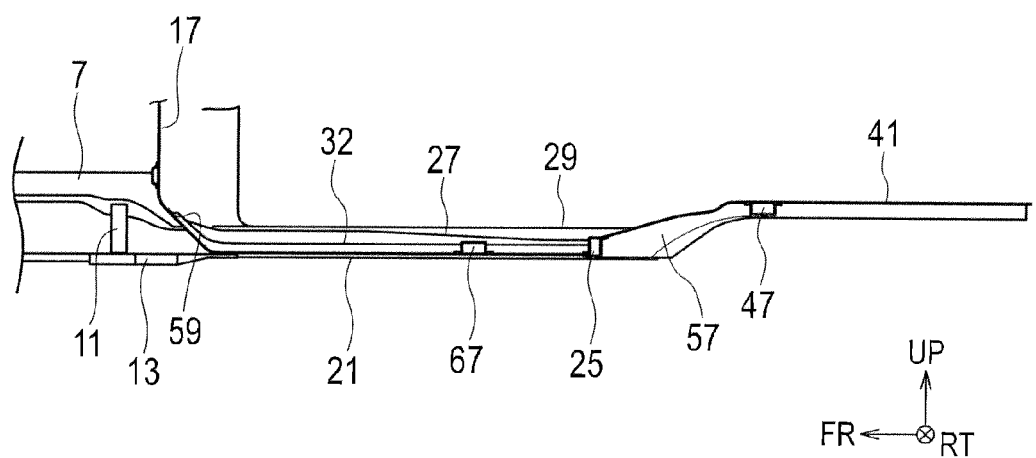
FIG. 5 is a schematic cross-sectional view taken along the V-V line in FIG. 3.

The front end of the front floor panel 21 is joined to the rear end of the dash lower panel 17 bending to extend upward. Moreover, the paired left and right center side members 32 are formed in a truncated V shape in a plan view as a whole by extending in such a way as to shift farther outward in the vehicle width direction in a plan view as they get closer to the rear of the vehicle (or to be situated farther inside in the vehicle width direction in a plan view as they get closer to the front of the vehicle). Specifically, each center side member 32 is formed in a substantially hat shape in cross section and is formed of a curved portion 59, a front bent portion 61, a body portion 63, and a rear bent portion 65 as an integral part. The curved portion 59 is disposed at the front end. The front bent portion 61 is disposed behind the curved portion 59. The body portion 63 is disposed behind the front bent portion 61. The rear bent portion 65 is disposed behind the body portion 63. As shown in FIGS. 3 and 5, the curved portion 59 curves upward in a side view and is joined to and along the cabin side of a bent corner portion of the dash lower panel 17. As shown in FIG. 4, in a plan view, the front bent portion 61 bends from the rear end of the curved portion 59 and extends in the front-rear direction substantially in parallel with the floor tunnel 27. The body portion 63 extends straightly from the rear end of the front bent portion 61 in such a way as to shift farther outward in the vehicle width direction as it gets closer to the rear of the vehicle (or to be situated farther inside in the vehicle width direction as it gets closer to the front of the vehicle). The rear bent portion 65 extends rearward from the rear end of the body portion 63 substantially in parallel with the floor tunnel 27, and its rear end 65a is joined to the front wall of the seat cross member 25. Note that the curved portion 59 disposed at the front end of the center side member 32 is connected to the rear end of the side member 7 through the dash lower panel 17 as shown in FIGS. 3 and 5. As described above, each center side member 32 couples the front frame member 51 and the rear frame member 53 to each other. Moreover, a front portion of the center side member 32 is arranged along the cabin side of the dash lower panel 17 from the floor panel.

Further, as shown in FIGS. 3 and 4, the center cross member 23 extends in the vehicle width direction and is formed of: a coupling body 67 coupling the floor tunnel 27 and the body portions 63 of the center side members 32 to each other; and coupling brackets 69 coupling the body portions 63 of the center side members 32 and the side sills 29 to each other, respectively. Accordingly, the center cross member 23 extending in the vehicle width direction couples the floor tunnel 27, the center side members 32, and the side sills 29 to each other. Moreover, in this embodiment, the seat cross member 25 and the center side members 32 are arranged on the cabin side of the front floor panel 21, and the front floor panel 21 and the dash lower panel 17 form part of a shell structure. Furthermore, the seat cross member 25 and the center side member 32 are configured to reinforce this shell structure.

Figure 6:
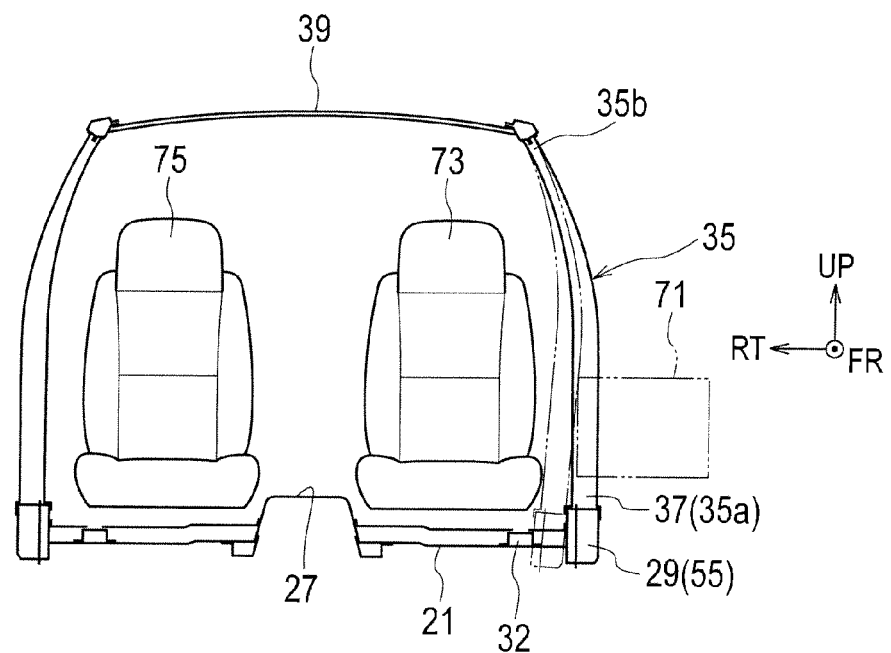
FIG. 6 is a schematic view showing a deforming behavior occurring upon input of a load into the vehicle body of the first embodiment from a lateral side.

Next, a deforming behavior occurring upon input of a lateral load from a lateral side of the vehicle body will be described using FIG. 6.

The form of the vehicle body in a normal state is the form illustrated with the solid lines. The two-dot chain lines illustrate the form deformed by a lateral load inputted toward the cabin (inward in the vehicle width direction) as a result of the collision of an obstacle 71 with the center pillar 35. Note that as mentioned earlier, the connecting portion 37 of the lower end portion 35a of the center pillar 35 and the side sill 29, and the center side member 32 are disposed away from each other with the predetermined clearance L therebetween in the vehicle width direction. For this reason, while the lower end portion 35a of the center pillar 35 undergoes deformation and displacement toward the cabin, the position of the upper end portion 35b of the center pillar 35 hardly changes. Accordingly, of seats 73 and 75 disposed on the left and right sides, the head of an occupant seated on the seat 73 can be protected effectively.

Operations and effects of this embodiment will be described below.

(1) The vehicle body structure of this embodiment includes: the front frame member 51 disposed in the front part of the vehicle body; the rear frame member 53 disposed in the rear part of the vehicle body; and the paired left and right middle frame members 55 disposed respectively on the outer sides, in the vehicle width direction, of the vehicle body and extending in the vehicle front-rear direction between the front frame member 51 and the rear frame member 53. Each of the paired left and right middle frame members 55 is formed of: the side sill 29 (first middle frame member) disposed on the outer side in the vehicle width direction; and the center side member 32 (second middle frame member) disposed inward, in the vehicle width direction, of the side sill 29 and coupling the front frame member 51 and the rear frame member 53 to each other. Each center side member 32 extends in such a way as to shift farther outward in the vehicle width direction as it gets closer to the rear of the vehicle. The strength of the center side member 32 is set larger than the strength of the side sill 29.

Thus, the center side member 32 improves the rigidity of the vehicle body, thereby reducing reinforcement for the side sill 29 and the like to the minimum extent. Accordingly, the vehicle body can be made lighter as a whole while maintaining its rigidity at a high level.

(2) The paired left and right center side members 32 are disposed in such a way as to be situated farther outside in the vehicle width direction in a plan view as they get closer to the rear of the vehicle. Moreover, the rear end 65a of each of the center side members 32 is connected to the rear frame member 53.

Since the center side members 32 are formed in such a way as to be situated farther outside in the vehicle width direction in a plan view as they get closer to the rear of the vehicle as described above, a load inputted into the front frame member 51 in a frontal collision is transmitted efficiently to the rear frame member 53 through the center side members 32. Specifically, in a frontal collision, the center side members 32 undergo crushing deformation in their longitudinal direction without tilting in the vehicle width direction, thereby efficiently absorbing the collisional energy. In contrast, if these left and right second middle frame members are disposed on straight lines that are parallel with each other, the second middle frame members may be displaced obliquely in the vehicle width direction in a plan view in a frontal collision. This makes it difficult for the second middle frame members to undergo the longitudinal crushing deformation.

(3) The floor tunnel 27 extending in the vehicle front-rear direction is provided at the center in the vehicle width direction between the paired left and right middle frame members 55 and 55. Moreover, a front portion of each center side member 32 has the front bent portion (bent portion) 61 bending to extend along the floor tunnel 27 in a plan view.

Thus, since the floor tunnel 27 is a part with high strength, disposing the front portion of each center side member 32 near the floor tunnel 27 and bending the front portion to make it extend substantially parallel with the floor panel 27 can further improve the strength of the center side member 32 (or the strength of the middle frame member 55).

(4) The floor tunnel 27, the center side members 32, and the side sills 29 are coupled to each other by the center cross member 23 extending in the vehicle width direction.

Since the floor tunnel 27, the side sills 29, and the center side members 32 are rigid frame members, coupling these frame members to each other improves the rigidity of the vehicle body. Accordingly, the vehicle body can be made even lighter as a whole.

(5) The seat cross member 25 extending in the vehicle width direction is arranged at the front end of the rear frame member 53. Moreover, the rear end of each center side member 32 is connected to the seat cross member 25, and the center side member 32 is arranged on the front floor panel (floor panel) 21.

Thus, in a rear collision, a load directed toward the front and inputted into the rear frame member 53 is transmitted to the seat cross member 25 over the entire length thereof, thereby receiving the load on a wide area. Moreover, since a stressed-skin structure configured to distribute a load transmitted to the center side members 32 to the entire floor panel is employed, the energy of a rear collision can be absorbed efficiently by use of the entire area of the floor panel in addition to the center side members 32. These features improve the rigidity of the vehicle body. Accordingly, the thickness of panels forming the vehicle body can be reduced generally, thereby further reducing the weight of the vehicle body.

(6) The suspension member 13 is fastened to the center side members 32 disposed on the upper side (cabin side) of the front floor panel 21 from the lower side (non-cabin side) of the front floor panel 21 with the front floor panel 21 sandwiched therebetween.

Accordingly, the mounting rigidity of the suspension member 13 is improved, which in turn brings about an advantageous effect that leads to an improvement in the rigidity of the vehicle body.

(7) The lateral portions of the side sills 29 are connected to both ends, in the vehicle width direction, of the seat cross member 25, respectively.

Thus, the side sills 29 and the center side members 32 are connected to the seat cross member 25, thereby improving the rigidity of the vehicle body. Accordingly, the vehicle body can be made lighter as a whole.

(8) The lower end portion 35a of each center pillar 35 is connected to the corresponding side sill 29, and their connecting portion 37 and the corresponding center side member 32 are disposed away from each other in the vehicle width direction.

Thus, in a lateral collision, the amount of inward deformation and displacement of the upper end portion 35b of the center pillar 35 in the vehicle width direction is smaller than that of the connecting portion. Accordingly, the head of the occupant can be protected effectively.

(9) Each side sill 29 is joined to a corresponding lateral end portion of the floor panel and couples the lower end portions 33a and 35a of the corresponding front pillar 33 and center pillar 35 to each other.

Thus, the side sill 29 is connected to the front floor panel 21, the front pillar 33, and the center pillar 35. Accordingly, the rigidity of the vehicle body is further improved, thereby further reducing the weight of the vehicle body.

(10) The dash lower panel 17 extending upward is joined to a front portion of the front floor panel 21, and the front portion of each center side member 32 is arranged along the cabin side of the dash lower panel 17 from the front floor panel 21.

Accordingly, when a load directed toward the rear is inputted in a frontal collision into the front portion of each center side member 32 from the front frame member 51 through the dash lower panel 17, the center side member 32 can receive this inputted load securely. In contrast, if each center side member 32 is arranged on the non-cabin side of the dash lower panel 17, the input of a load directed toward the rear into the dash lower panel 17 may cause the detachment of the dash lower panel 17 from the center side member 32, hence making it impossible to receive the inputted load to a sufficient extent.

(11) A front side of the front bent portion 61 at the front portion of each center side member 32 is formed as the curved portion 59 curving upward, and this curved portion 59 is joined to and along the cabin side of the dash lower panel 17.

Accordingly, when a load directed toward the rear is inputted in a frontal collision into the curved portion 59 of each center side member 32 from the front frame member 51 through the dash lower panel 17, this inputted load can be received further securely by the curved portion 59 of the center side member 32.

(12) The seat cross member 25 and each center side member 32 are arranged on the cabin side of the front floor panel 21. The front floor panel 21 and the dash lower panel 17 form part of the shell structure. Moreover, the seat cross member 25 and the center side member 32 reinforce the shell structure.

Accordingly, since the front floor panel 21 and the dash lower panel 17 form part of the shell structure, and the seat cross member 25 and the center side member 32 reinforce the shell structure, the rigidity of the vehicle body is further improved.

(13) A method of manufacturing the vehicle body of this embodiment includes the steps of: disposing the front frame member 51 in the front part of the vehicle body; disposing the rear frame member 53 in the rear part of the vehicle body: and providing the paired left and right middle frame members 55 on the outer sides, in the vehicle width direction, of the vehicle body, respectively, the paired left and right middle frame members 55 extending in the vehicle front-rear direction between the front frame member 51 and the rear frame member 53. Each of the paired left and right middle frame members 55 includes: the side sill 29 disposed on the outer side in the vehicle width direction; and the center side member 32 disposed inward, in the vehicle width direction, of the side sill 29 and coupling the front frame member 51 and the rear frame member 53 to each other. The center side member 32 extends in such a way as to shift farther outward in the vehicle width direction as it gets closer to the rear of the vehicle. Furthermore, the strength of the center side member 32 is set larger than the strength of the side sill 29.

Thus, the center side member 32 improves the rigidity of the vehicle body, thereby reducing reinforcement for the side sill 29 and the like to the minimum extent. Accordingly, the vehicle body can be made lighter as a whole.

Second Embodiment

Next, a second embodiment will be described. Components with the same structures as those in the foregoing first embodiment are denoted by the same reference signs, and description thereof is omitted.

Figure 7:
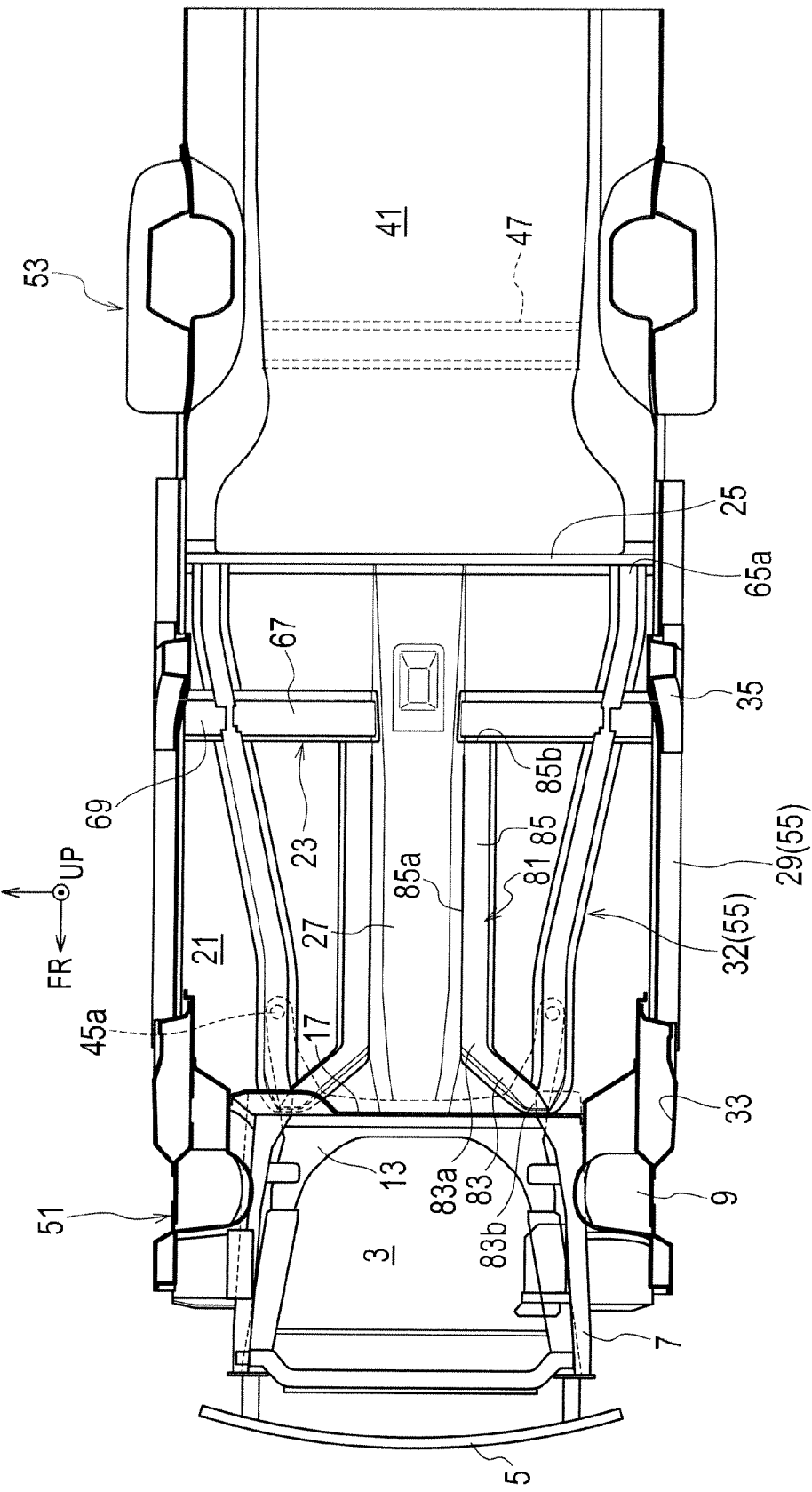
FIG. 7 is a cross-sectional view of a second embodiment corresponding to FIG. 4 of the first embodiment.

This embodiment applies paired left and right inner coupling members 81 (inner coupling members) to the first embodiment. As shown in FIG. 7, the inner coupling members 81 are arranged left-right symmetrically about the floor tunnel 27 and couple front portions of their respective center side members 32 and the floor tunnel 27 to each other on the upper side (cabin side) of the front floor panel 21.

Each inner coupling member 81 is formed bending in a dogleg shape in a plan view and is formed of a front bent portion 83 and a body portion 85 as an integral part, the front bent portion 83 being in a front side of the vehicle while the body portion 85 extending toward the rear of the vehicle from a rear end 83a of the front bent portion 83. The front bent portion 83 extends obliquely in such a way as to shift farther outward in the vehicle width direction as it gets closer to the front of the vehicle (or to be situated farther inside in the vehicle width direction as it gets closer to the rear of the vehicle), and its front end 83b is joined to the center side member 32. Moreover, an inner end portion 85a of the body portion 85 in the vehicle width direction is joined to the corresponding lateral surface of the floor tunnel 27 and extends toward the rear of the vehicle, and its rear end 85b is joined to the center cross member 23.

According to this embodiment, each inner coupling member 81 (inner coupling member) coupling the front portion of the corresponding center side member 32 and the floor tunnel 27 to each other is provided on the upper side (cabin side) of the front floor panel 21. Thus, the strength of the center side member 32 is improved, which in turn improves the rigidity of the whole vehicle body. Accordingly, the weight of the whole vehicle body can be further reduced.

Third Embodiment

Next, a third embodiment will be described. Components with the same structures as those in the foregoing first and second embodiments are denoted by the same reference signs, and description thereof is omitted.

Figure 8:
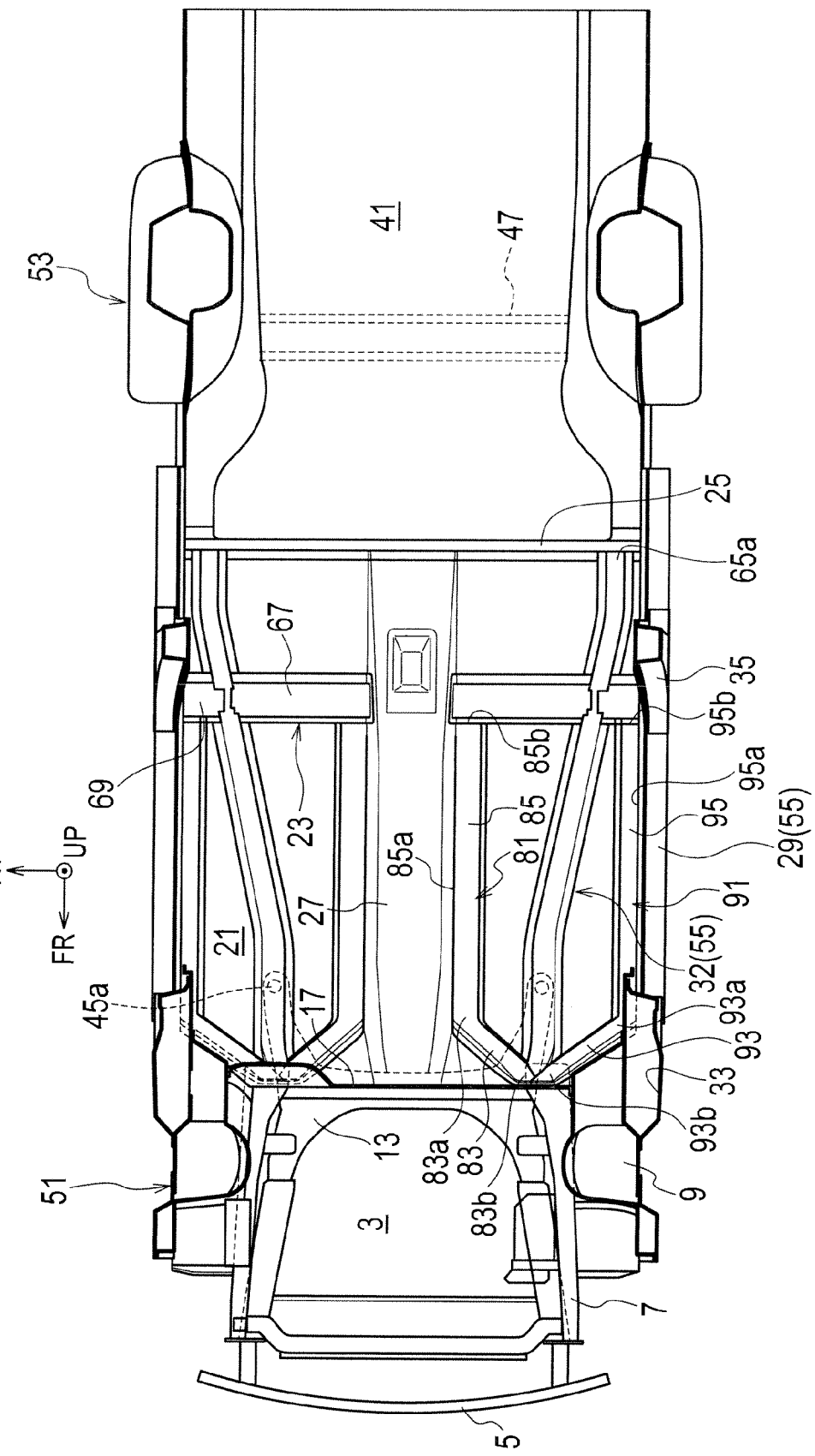
FIG. 8 is a cross-sectional view of a third embodiment corresponding to FIG. 4 of the first embodiment and FIG. 7 of the second embodiment.

This embodiment applies paired left and right outer coupling members 91 (outer coupling members) to the second embodiment. As shown in FIG. 8, the outer coupling members 91 are arranged left-right symmetrically about the floor tunnel 27 and couple front portions of the center side members 32 and the side sills 29 to each other, respectively, on the upper side (cabin side) of the front floor panel 21.

Each outer coupling member 91 is formed bending in a dogleg shape in a plan view and is formed of a front bent portion 93 and a body portion 95 as an integral part, the front bent portion 93 being disposed in a front side of the vehicle while the body portion 95 extending toward the rear of the vehicle from a rear end 93a of the front bent portion 93. The front bent portion 93 extends obliquely in such a way as to shift farther inward in the vehicle width direction as it gets closer to the front of the vehicle, and its front end 93b is joined to the center side member 32. Moreover, an outer end portion 95a of the body portion 95 in the vehicle width direction is joined to the lateral surface of the side sill 29 and extends toward the rear of the vehicle, and its rear end 95*b* is joined to the center cross member 23.

According to this embodiment, each outer coupling member 91 (outer coupling member) coupling the front portion of the corresponding center side member 32 and the corresponding side sill 29 to each other is provided on the upper side (cabin side) of the front floor panel 21. Thus, the strength of the center side member 32 is improved, which in turn improves the rigidity of the whole vehicle body. Accordingly, the weight of the whole vehicle body can be further reduced.

Note that while this embodiment applies the outer coupling members 91 to the second embodiment, the outer coupling members 91 are applicable also to the first embodiment. The first embodiment employing the outer coupling members 91 will be referred to as a modification of the third embodiment. According to this modification, it is possible to improve the rigidity of the whole vehicle body, and also to reduce the weight of the whole vehicle body even further.

Fourth Embodiment

Next, a fourth embodiment will be described. Components with the same structures as those in the foregoing first to third embodiments are denoted by the same reference signs, and description thereof is omitted.

This embodiment is different from the first embodiment in that first support members (first support frame members) 106 and second support members (second support frame members) 108 are arranged which couple the center side members 32 and the side sills 129 to each other, respectively.

Figure 9:
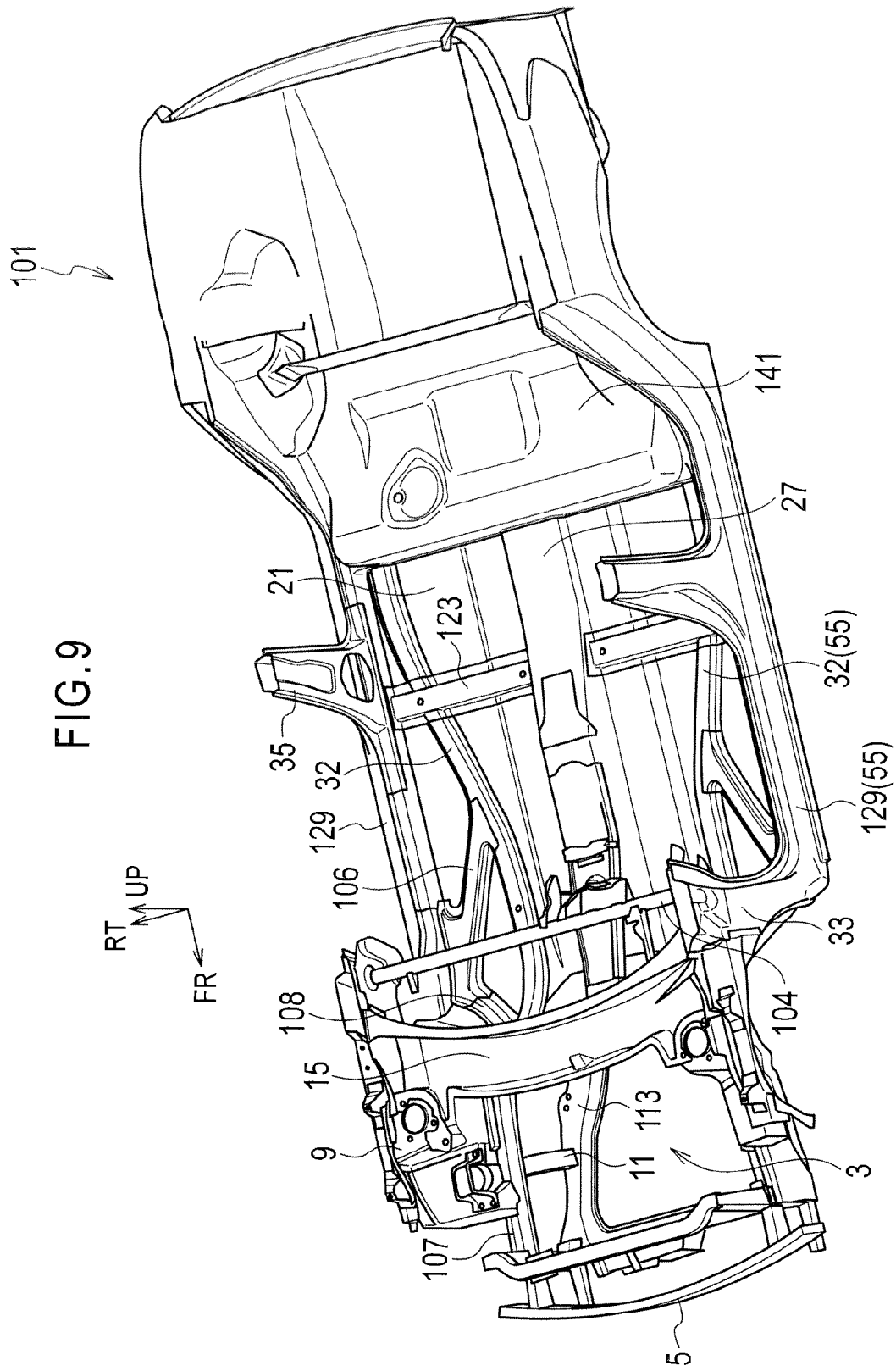
FIG. 9 is a perspective view showing a main part of a vehicle body of a fourth embodiment.

As shown in FIG. 9, the bumper reinforcement 5 extending in the vehicle width direction is arranged at the front end of a vehicle body 101, and paired left and right side members 107 are provided extending from the bumper reinforcement 5 toward the rear of the vehicle. A suspension member 113 is supported on and below the side members 107 with the coupling brackets 11 disposed therebetween. Moreover, the left and right front pillars 33 are bridged by a crossbar 104. Furthermore, the paired left and right side sills 129 are arranged in the lateral parts of the vehicle body, respectively. There is a center cross member 123 extending in the vehicle width direction and coupling the floor tunnel 27 to the portion of each side sill 129 connected to the lower end portion of the corresponding center pillar. Note that a rear floor panel 141 continuous with the front floor panel 21 is arranged in the rear part of the vehicle body.

Figure 10:
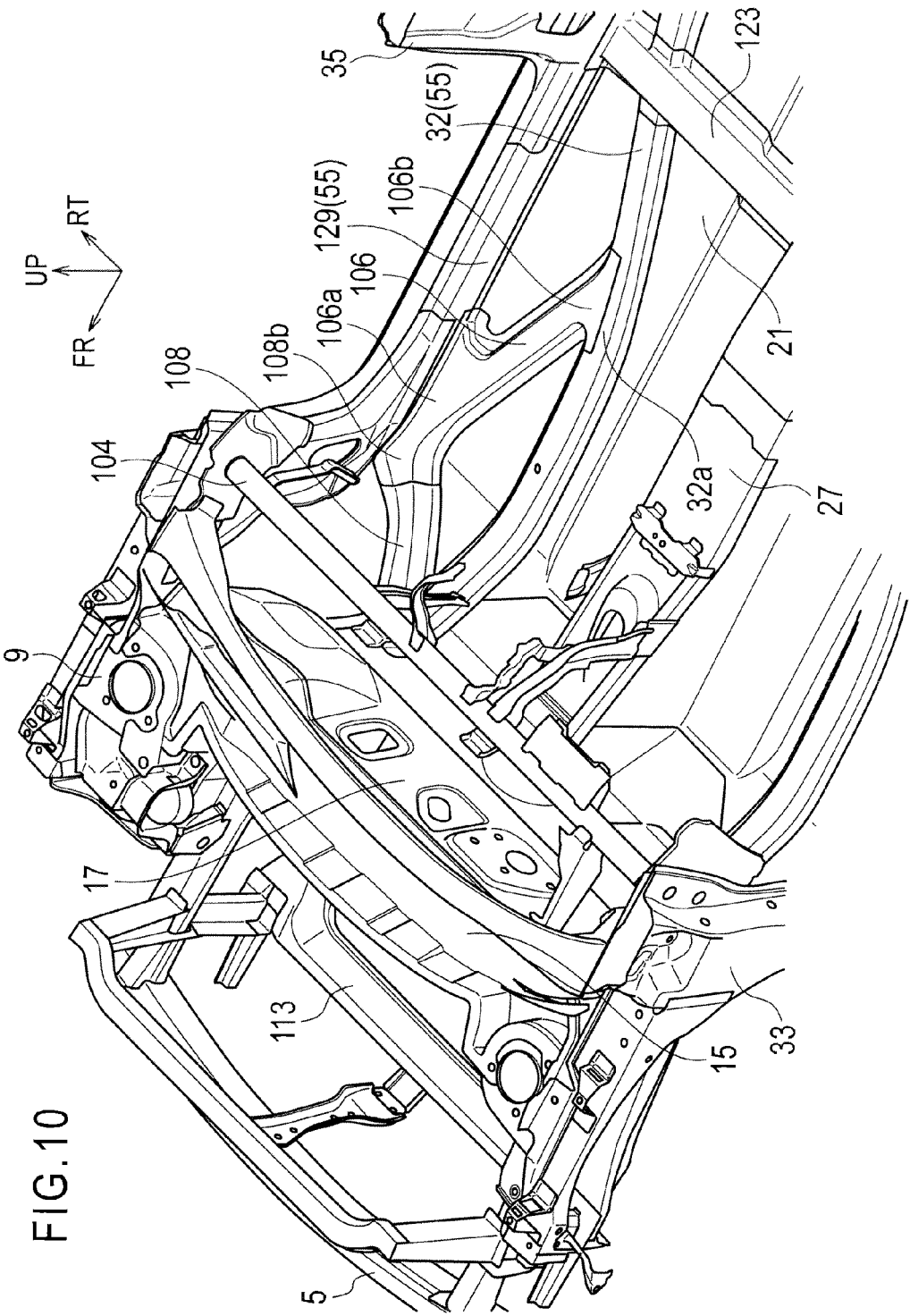
FIG. 10 is a perspective view showing a front part of the main part of the vehicle body in FIG. 9.
Figure 11:
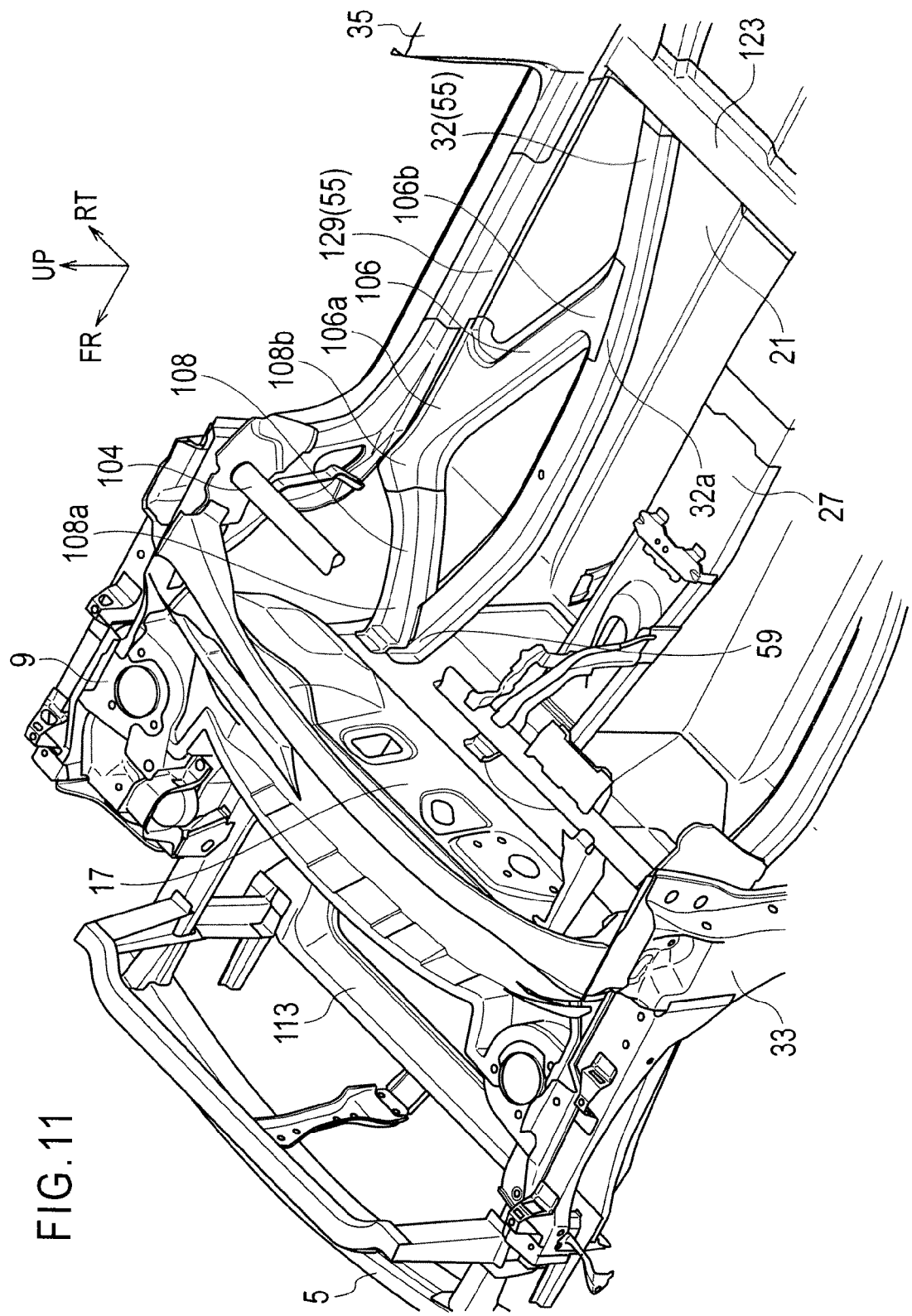
FIG. 11 is a perspective view showing a state where a crossbar in FIG. 10 is partially cut away.
Figure 12:
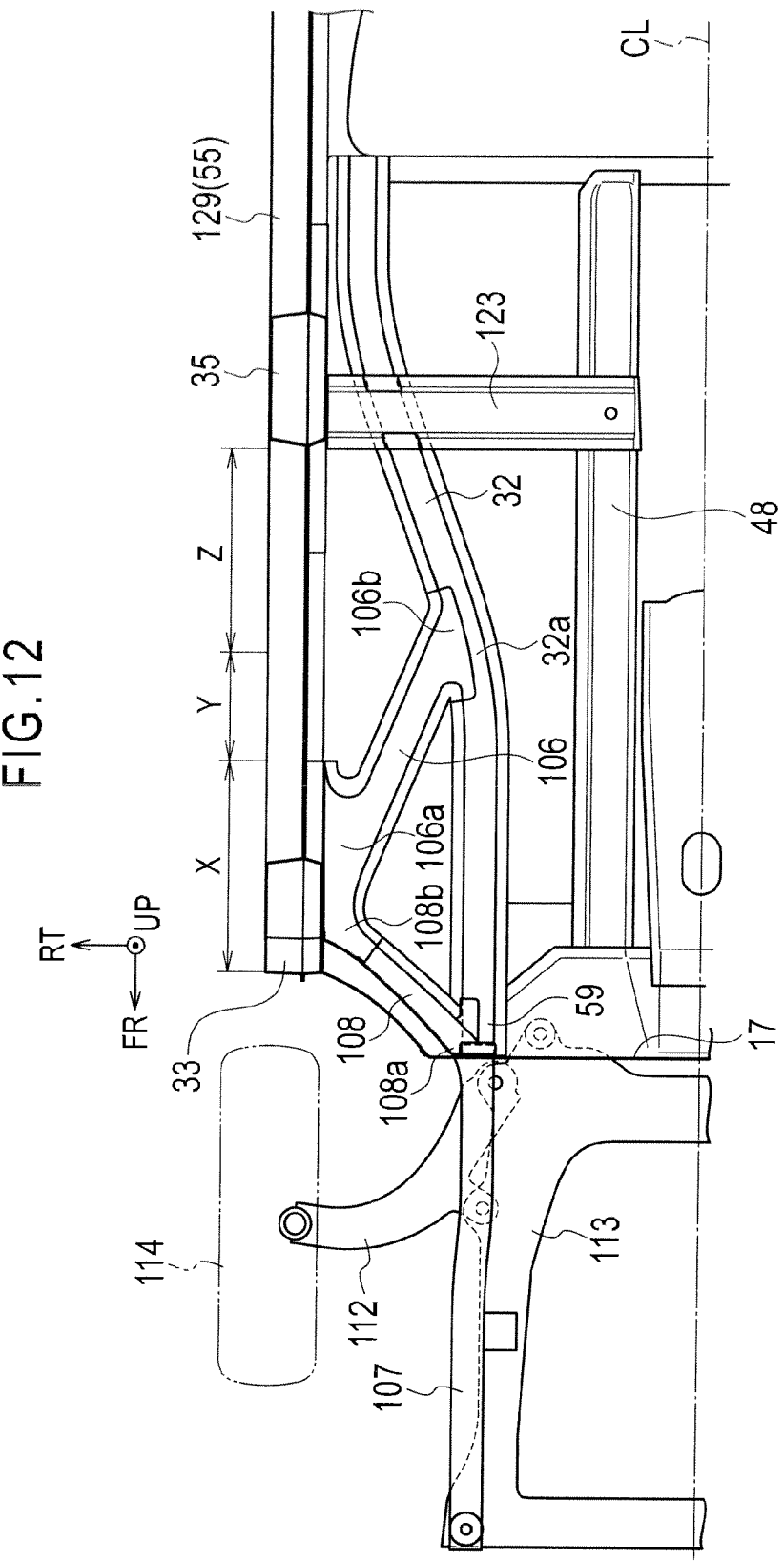
FIG. 12 is a plan view showing the right half, in the vehicle width direction, of the front part in FIG. 10 with a front floor panel being unillustrated.

As shown in FIGS. 10 to 12, an intermediate portion 32*a* of each center side member 32 corresponds to a front end portion of the body portion 63 (see FIG. 4) and bends and extends in such a way as to shift farther outward in the vehicle width direction as it gets closer to the rear of the vehicle. Each first support member 106 has its rear end portion 106*b* connected to the intermediate portion 32*a* of the corresponding center side member 32 and its front end portion 106*a* connected to a front end portion of the corresponding side sill 129 and to a rear end portion 108*b* of the corresponding second support member 108. As described above, the first support member 106 extends obliquely in such a way as to shift farther outward in the vehicle width direction as it gets closer to the front of the vehicle. On the other hand, each second support member 108 has its rear end portion 108*b* connected to the front end portion of the corresponding side sill 129 and to the front end portion 106*a* of the corresponding first support member 106. Moreover, the front end portion 108*a* is connected to the curved portion 59 (see FIG. 4) disposed at the front end of the center side member 32. As described above, the second support member 108 extends in such a way as to shift farther inward in the vehicle width direction as it gets closer to the front of the vehicle. Note that in FIG. 12, the front floor panel 21 is omitted, so that the support members 48 arranged on the lower side of the front floor panel 21 are visible.

Further, as shown in FIG. 12, each side sill 129 has an X section, a Y section, and a Z section in this order from the front. The X section is a section in which the lower end portion of the front pillar 33, the front end portion 106*a* of the first support member 106, and the rear end portion 108*b* of the second support member 108 are connected to each other, and which therefore has higher rigidity than those of the Y section and the Z section. The Y section is a section which is disposed behind the X section and has lower rigidity than those of the X section and the Z section. The Z section is disposed behind the Y section and has rigidity between those of the X section and the Y section because an unillustrated brace is arranged inside the Z section. In other words, the degrees of rigidity are set as X section>Z section>Y section. Note that wheels 114 are mounted to the suspension member 113 through arms 112, respectively.

Figure 13:
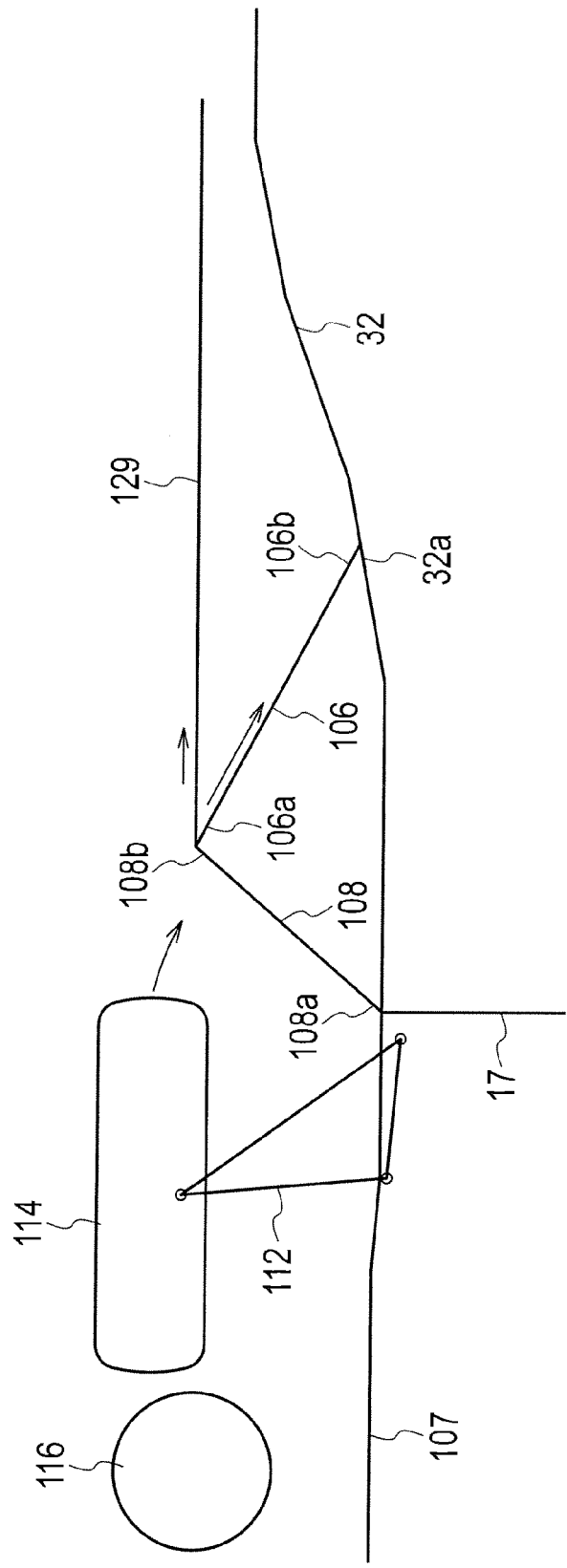
FIG. 13 is a diagram schematically showing FIG. 12.

Next, by using FIG. 13, description will be given of a deforming behavior occurring upon input of a collision load directed toward the rear of the vehicle into a lateral portion of a front end part of the vehicle body (a deforming behavior in a small overlap collision in which the load input surface is concentrated in a lateral end portion of the vehicle). Specifically, as shown in FIG. 13, the following considers a situation where an obstacle 116 is disposed ahead of one of the wheels 114 during travel.

In the collision of the vehicle, a collision load is inputted into the wheel 114 from the obstacle 116, and this collision load causes the wheel 114 to pivot rearward through its arm 112 and collide with the front end portion of its side sill 129.

Here, the front end portion 106*a* of the first support member 106 and the rear end portion 108*b* of the second support member 108 are connected to the front end portion of the side sill 129. Moreover, the rear end portion 106*b* of the first support member 106 is connected to the intermediate portion 32*a* of the center side member 32, and this intermediate portion 32*a* bends and extends in such a way as to shift farther outward in the vehicle width direction as it gets closer to the rear of the vehicle.

Accordingly, the collision load can be efficiently transmitted to the center side member 32 through the first support member 106 as illustrated by an arrow, and the amount of load transmission to the side sill 129 can be reduced as well.

Note that in a case where a collision load directed toward the rear is inputted into the side member 107 from the front, the collision load is split and transmitted to the center side member 32 and the second support member 108.

Operations and effects of this embodiment will be described below.

(1) The first support members 106 (first support frame members) coupling their respective center side members 32 (second middle frame members) and side sill 129 (first middle frame members) to each other are provided. Moreover, each first support member 106 extends obliquely in such a way as to shift farther outward in the vehicle width direction in a plan view as it gets closer to the front of the vehicle. Thus, as described using FIG. 13, when a collision load directed toward the rear of the vehicle is inputted to a lateral portion of a front end part of the vehicle, a large portion of the collision load is efficiently transmitted to the center side member 32 through the first support member 106, and the amount of load transmission to the side sill 129 can be reduced as well.

Accordingly, the vehicle body can be made lighter as a whole while maintaining its rigidity at a high level.

(2) The front end portions 106a of the first support members 106 (first support frame members) are respectively coupled to the side sills 129 (first middle frame members), and the second support members 108 (second support frame members) respectively coupling their connecting portions to the center side members 32 (second middle frame members) are arranged closer to the front of the vehicle than the first support members 106 are. Thus, when a collision load directed toward the rear of the vehicle is inputted into a lateral portion of a front end part of the vehicle, the first support member 106 is prevented from opening outward in the vehicle width direction since the second support member 108 supports the first support member 106. Thereby, the collision load can be effectively transmitted to the first support member 106. Accordingly, the vehicle body can be made lighter as a whole while maintaining its rigidity at a high level.

(3) As described using FIG. 12, each side sill 129 has the X section, the Y section, and the Z section in this order from the front, and the degrees of rigidity thereof are set as X section>Z section>Y section. Thus, the X and Z sections are hard to crush, making the Y section easier to crush efficiently. By this crush, the X section is efficiently displaced rearward when the wheel 114 hits the X section upon input of a collision load directed toward the rear of the vehicle into a corresponding lateral portion of a front end part of the vehicle. Accordingly, it is possible to effectively transmit a collision load to the first support member 106.

Note that the first and second support members 106 and 108 are applicable also to the second embodiment and the third embodiment (including its modification). The second embodiment and the third embodiment (including its modification) employing the first and second support members 106 and 108 will be referred to as modifications of the fourth embodiment. These modifications can achieve operations and effects similar to the operations and effects described in this embodiment.

Fifth Embodiment

Next, a fifth embodiment will be described. Components with the same structures as those in the foregoing first to fourth embodiments are denoted by the same reference signs, and description thereof is omitted.

This embodiment is different from the fourth embodiment in that a front cross member 110 is arranged.

Figure 14:
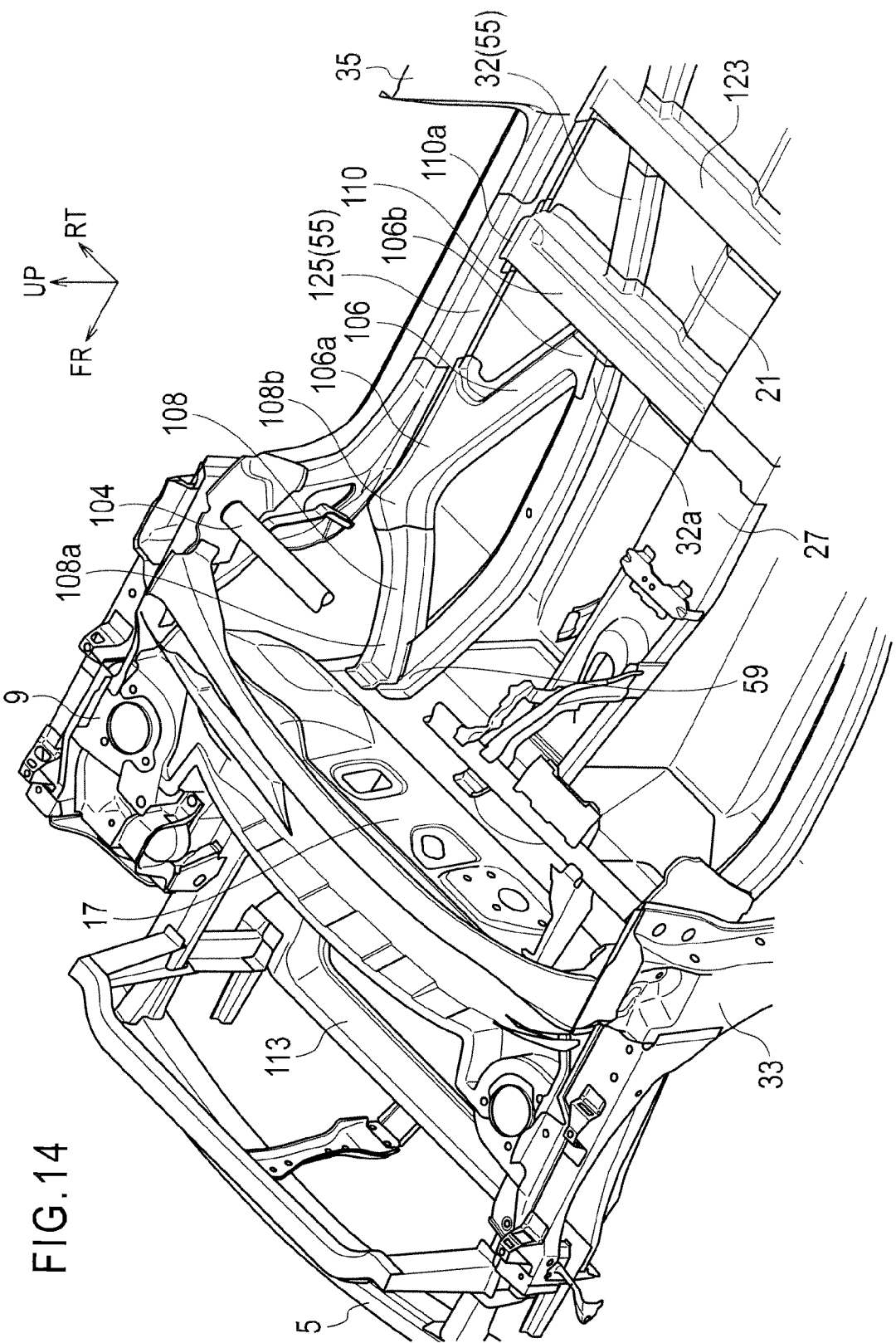
FIG. 14 is a perspective view showing a main part of a vehicle body of a fifth embodiment and corresponding to FIG. 11.
Figure 15:
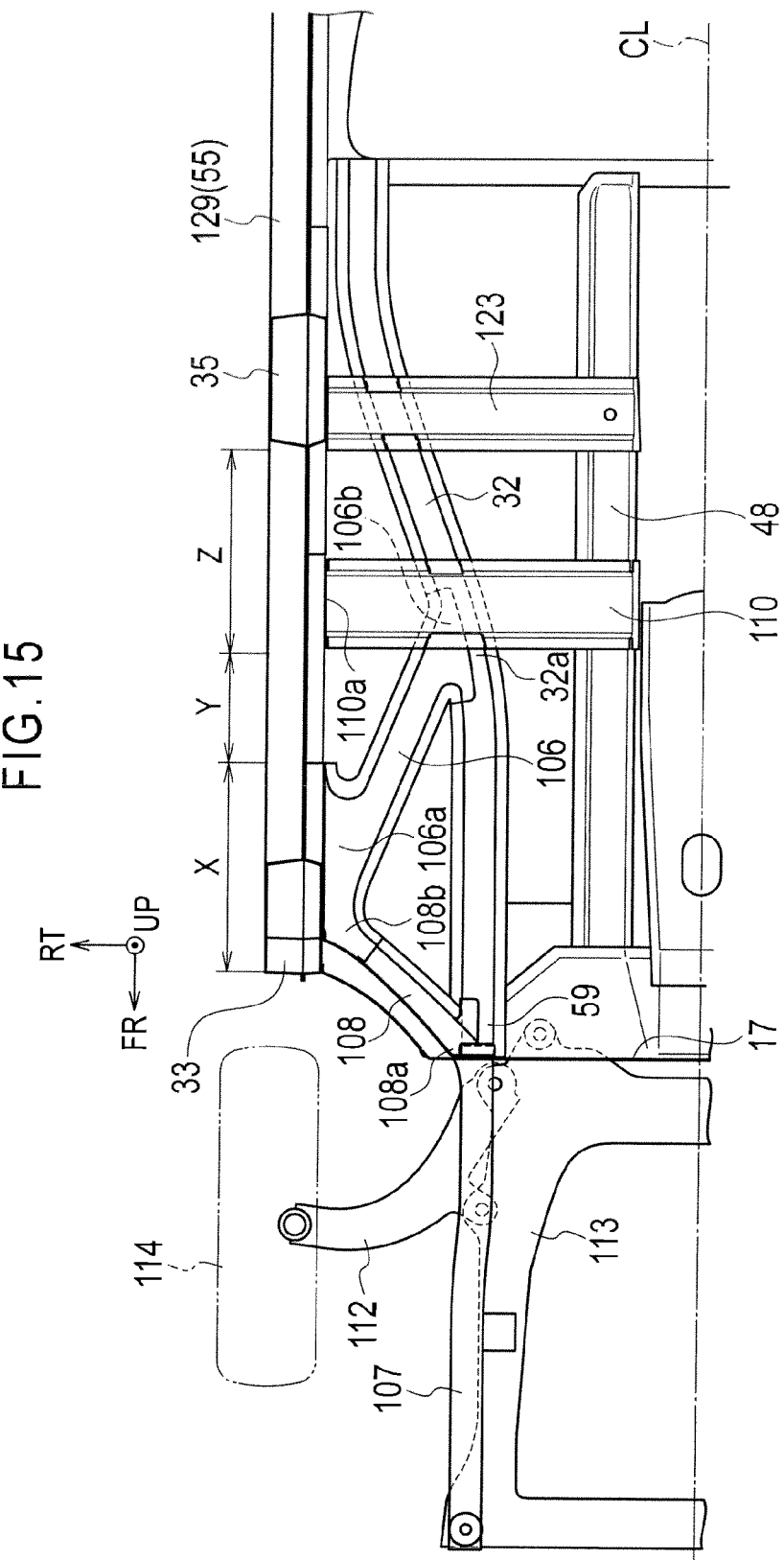
FIG. 15 is a plan view showing the right half, in the vehicle width direction, of the main part of the vehicle body in FIG. 14 with a front floor panel being unillustrated.

As shown in FIGS. 14 and 15, this front cross member 110 extends in the vehicle width direction and couples the floor tunnel 27 and the side sills 129 to each other. Moreover, the rear end portion 106b of each support member 106 is connected to the intermediate portion 32a of its corresponding center side member 32, and the front cross member 110 extends in the vehicle width direction in such a way as to straddle their connecting portion and also joins the connecting portion to the front floor panel 21. End portions 110a of the front cross member 110 in the vehicle width direction are connected to the lateral surfaces of the side sills 129, respectively.

According to this embodiment, the rear end portion 106b of each first support member 106 is connected to the intermediate portion 32a of its corresponding center side member 32, and their connecting portion and the corresponding side sill 129 are coupled to each other by the front cross member 110 extending in the vehicle width direction. Thus, the connecting portion is supported by the front cross member 110, thereby improving the support rigidity. Accordingly, when a collision load directed toward the rear of the vehicle is inputted into a lateral portion of a front end part of the vehicle and transmitted to the first support member 106, this collision load can be securely supported.

Moreover, this embodiment can also provide an advantageous effect that, in a case where a lateral collision load is inputted into a lateral part of the vehicle, this collision load is supported by the front cross member 110.

Note that the front cross member 110 is applicable also to the first to third embodiments (including their modifications) and to the modifications of the fourth embodiment. These modifications can achieve operations and effects similar to the operations and effects described in this embodiment.

While embodiments of the present invention have been described hereinabove, these embodiments are merely illustration described for the purpose of facilitating the understanding of the present invention, and the present invention is not limited to the embodiments. The technical scope of the present invention is not limited to the specific technical matters disclosed in the embodiments but includes various modifications, changes, alternative techniques, and the like which can readily be conceived therefrom.

The present application is based upon and claims the benefit of priority from the prior Japanese Patent Application No. 2011-185772 filed on Aug. 29, 2011 and Japanese Patent Application No. 2012-111273 filed on May 15, 2012, and the entire contents of these applications are incorporated herein by reference.

What is claimed is:

1. A vehicle body structure comprising:
a front frame member disposed in a front part of a vehicle body;
a rear frame member disposed in a rear part of the vehicle body and to a rear of the front frame member in a vehicle front-rear direction; and
paired left and right middle frame members disposed on outer sides, in a vehicle width direction, of the vehicle body, respectively, and extending in the vehicle front-rear direction between the front frame member and the rear frame member, wherein
each of the paired left and right middle frame members includes
a first middle frame member disposed on an outer side in the vehicle width direction, and
a second middle frame member disposed inward, in the vehicle width direction, of the first middle frame member and coupling the front frame member and the rear frame member to each other,
the second middle frame member extends in such a way as to shift farther outward in the vehicle width direction as it gets closer to a rear of the vehicle, and
strength of the second middle frame member is set larger than strength of the first middle frame member.

2. The vehicle body structure according to claim 1, further comprising:
a first support frame member which couples the second middle frame member and the first middle frame member to each other,
wherein the first support frame member extends obliquely in such a way as to shift farther outward in the vehicle width direction as it gets closer to a front of the vehicle.

3. The vehicle body structure according to claim 2, wherein
a front end portion of the first support frame member is connected to the first middle frame member, and
a second support frame member coupling a portion at which the front end portion and the first middle frame member are connected and the second middle frame member is arranged closer to the front of the vehicle than the first support frame member is.

4. The vehicle body structure according to claim 2, wherein
a rear end portion of the first support frame member is connected to an intermediate portion of the second middle frame member, and
a portion at which the rear end portion and the intermediate portion are connected and the first middle frame member are coupled to each other by a front cross member extending in the vehicle width direction.

5. The vehicle body structure according to claim 1, wherein
the second middle frame member is disposed in such a way as to be situated farther outside in the vehicle width direction in a plan view as it gets closer to the rear of the vehicle, and
a rear end of the second middle frame member is connected to the rear frame member.

6. The vehicle body structure according to claim 1, wherein
a floor tunnel extending in the vehicle front-rear direction is provided at a center in the vehicle width direction between the paired left and right middle frame members, and
a front portion of the second middle frame member has a bent portion bending to extend along the floor tunnel in a plan view.

7. The vehicle body structure according to claim 6, wherein the floor tunnel, the second middle frame member, and the first middle frame member are coupled to each other by a center cross member extending in the vehicle width direction.

8. The vehicle body structure according to claim 1, wherein
a seat cross member extending in the vehicle width direction is arranged at a front end of the rear frame member,
a rear end of the second middle frame member is connected to the seat cross member, and
the second middle frame member is arranged on a floor panel.

9. The vehicle body structure according to claim 8, wherein
a suspension member forming the front frame member is fastened to the second middle frame member disposed on a cabin side of the floor panel from a non-cabin side of the floor panel with the floor panel sandwiched therebetween.

10. The vehicle body structure according to claim 8, wherein both ends of the seat cross member in the vehicle width direction are connected to lateral portions of the first middle frame members, respectively.

11. The vehicle body structure according to claim 1, wherein
a lower end portion of a center pillar is connected to the first middle frame member, and
a portion at which the lower end portion of the center pillar and the first middle frame member are connected and the second middle frame member are disposed away from each other in the vehicle width direction.

12. The vehicle body structure according to claim 8, wherein the first middle frame member is joined to a lateral end portion of the floor panel and couples a lower end portion of a front pillar and a lower end portion of a center pillar to each other.

13. The vehicle body structure according to claim 8, wherein
a dash lower panel extending upward is joined to a front portion of the floor panel, and
a front portion of the second middle frame member is arranged along a cabin side of the dash lower panel from the floor panel.

14. The vehicle body structure according to claim 13, wherein
a front side of a bent portion at the front portion of the second middle frame member is formed as a curved portion curving upward, and
the curved portion is joined to and along the cabin side of the dash lower panel.

15. The vehicle body structure according to claim 13, wherein
the seat cross member and the second middle frame member are arranged on the cabin side of the floor panel,
the floor panel and the dash lower panel form part of a shell structure, and
the seat cross member and the second middle frame member reinforce the shell structure.

16. The vehicle body structure according to claim 6, further comprising:
an inner coupling member which couples the front portion of the second middle frame member and the floor tunnel to each other.

17. The vehicle body structure according to claim 6, further comprising:
an outer coupling member which couples the front portion of the second middle frame member and the first middle frame member to each other.

18. A method of manufacturing a vehicle body comprising:
disposing a front frame member in a front part of a vehicle body;
disposing a rear frame member in a rear part of the vehicle body and to a rear of the front frame member in a vehicle front-rear direction; and
providing paired left and right middle frame members on outer sides, in a vehicle width direction, of the vehicle body, respectively, the paired left and right middle frame members extending in the vehicle front-rear direction between the front frame member and the rear frame member, wherein
each of the paired left and right middle frame members includes
a first middle frame member disposed on an outer side in the vehicle width direction, and
a second middle frame member disposed inward, in the vehicle width direction, of the first middle frame member and coupling the front frame member and the rear frame member to each other,
the second middle frame member extends in such a way as to shift farther outward in the vehicle width direction as it gets closer to a rear of the vehicle, and
strength of the second middle frame member is set larger than strength of the first middle frame member.

* * * * *